United States Patent [19]

Mumma

[11] 4,402,155

[45] Sep. 6, 1983

[54] FISH LURE

[76] Inventor: Thurman H. Mumma, 10510 Brosius Rd., Garrettsville, Ohio 44231

[21] Appl. No.: 322,776

[22] Filed: Nov. 19, 1981

[51] Int. Cl.³ .............................................. A01K 85/00
[52] U.S. Cl. .................................. 43/42.09; 43/42.08
[58] Field of Search ................ 43/42.04, 42.08, 42.09, 43/42.11, 42.15

[56] References Cited

U.S. PATENT DOCUMENTS

| D. 154,033 | 6/1949 | Ferriot | D31/4 |
| D. 215,155 | 9/1969 | Perrin | D22/77 |
| D. 225,008 | 10/1972 | Cordell | D22/27 |
| D. 228,902 | 10/1973 | Perrin | D22/27 |
| D. 230,593 | 3/1974 | Storm | D22/27 |
| D. 242,795 | 12/1976 | Davis | D22/27 |
| 2,517,157 | 8/1950 | Adams | 43/42.36 |
| 2,694,876 | 6/1952 | Grasser | 43/42.09 |
| 3,091,883 | 6/1963 | Hufford | 43/42.08 |
| 3,299,561 | 1/1967 | Desbois | 43/42.09 |
| 3,628,276 | 12/1971 | Coalson | 43/42.09 |
| 3,818,626 | 6/1974 | Peippo | 43/42.04 |

FOREIGN PATENT DOCUMENTS

| 2409697 | 7/1979 | France | 43/42.08 |
| 2485880 | 1/1982 | France | 43/42.08 |

Primary Examiner—Nicholas P. Godici
Assistant Examiner—Kurt Rowan
Attorney, Agent, or Firm—Porter & Associates Co.

[57] ABSTRACT

A fish lure includes an ellipsoidal body portion having an axially extending ventral slot. A hook carrier is insertable into the slot and is retained in place there by a wedge which tightly locks the hook carrier and the body portion together. Upon removing the wedge, and without disconnecting the hook carrier from a fishing line to which it previously had been connected, the hook carrier can be removed from the body portion and another body portion can be substituted. Body portions according to the invention can be manufactured inexpensively from a plastics material in a molding operation. The hook carrier and the wedge can be manufactured inexpensively from metal in a stamping operation. The hook carrier and the wedge interact with the body portion in such a manner that another body portion can be substituted quickly, and yet an entire assembly of body portion, hook carrier, and wedge will be tightly secured together for various fishing operations such as casting and trolling. Because the body portion does not have hooks attached to it, a number of body portions can be carried by a fisherman in one pocket or placed in a compartment of a tackle box without tangling the body portions.

6 Claims, 7 Drawing Figures

U.S. Patent  Sep. 6, 1983  4,402,155
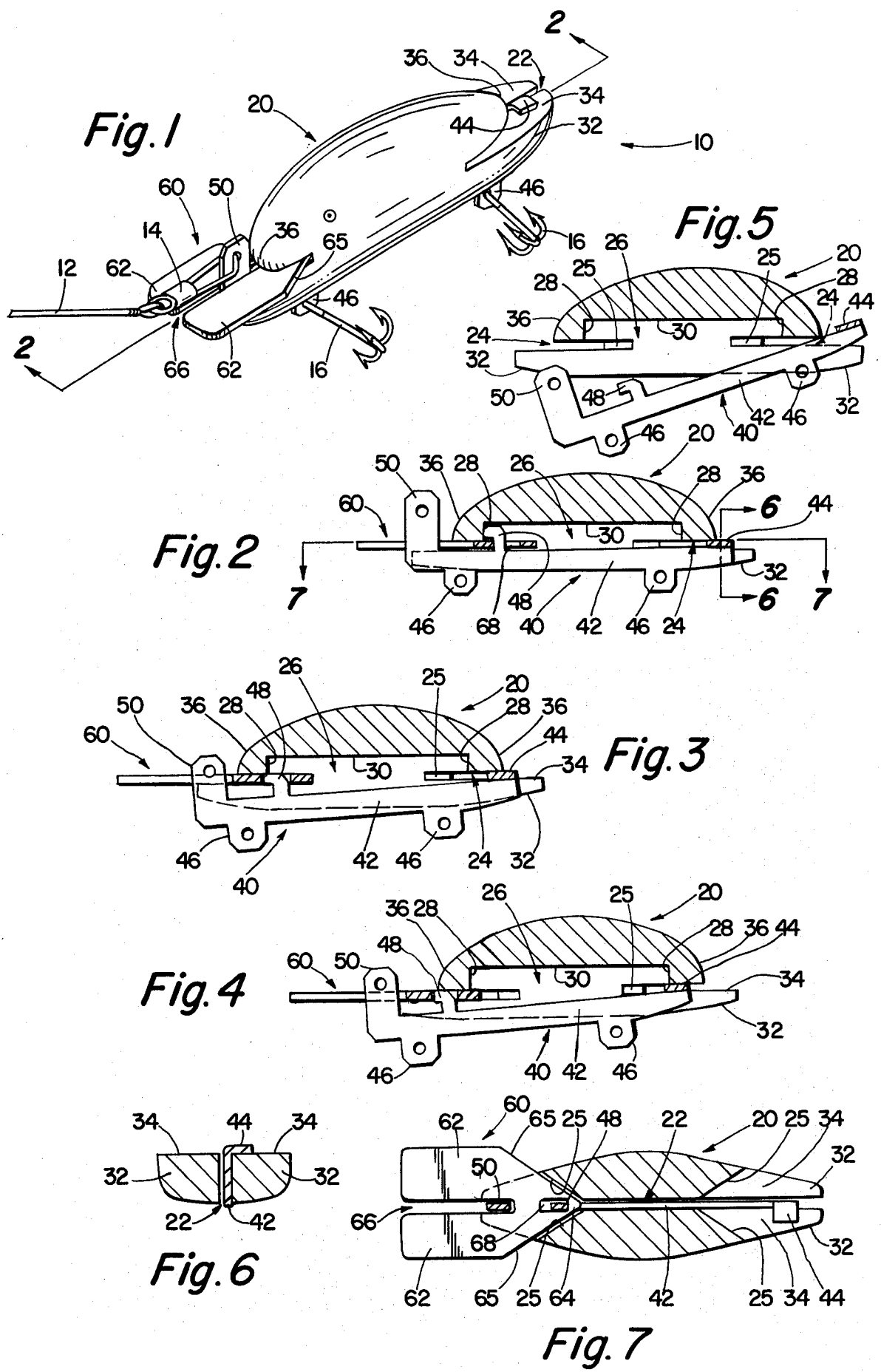

FISH LURE

CROSS-REFERENCE TO RELATED APPLICATION

FISH LURE, a design patent application filed concurrently by Thurman H. Mumma, Ser. No. 322,778, the disclosure of which is incorporated herein by reference.

BACKGROUND OF THE INVENTION

1. Field of the Invention

The invention relates to fishing lures, and more particularly, to artificial fish lures having interchangeable portions.

2. Description of the Prior Art

Depending on fishing conditions, it often is desirable to substitute one type of fish lure for another. It may be necessary to replace a lure depending on such variables as the time of day, the type of fish being sought, the temperature of the water, the depth to which the lure should descend, and other variables. When such a substitution is to be made, it is desirable that the change be mede quickly, and with little difficulty.

In those cases where artificial fish lures are employed, it may be desirable to interchange portions of a lure (rather than replacing the entire lure) so as to minimize the expense and difficulty associated with maintaining a large stock of different lures. A problem with prior lures employing interchangeable components is that they have employed components of undesirable complexity and expense. Particularly in the case of mass-produced items such as fish lures, it is necessary that the components be manufactured as inexpensively as possible, preferably in a molding or stamping operation. Prior fish lures have not been amenable to expeditious manufacture and assembly because they have involved such components as screws, complexly configured wire portions, and the like.

In addition to being inexpensive to manufacture, it is necessary that a fish lure having interchangeable portions be easy to manipulate, so that the interchangeable portions can be changed quickly, and under adverse conditions. For example, it may be necessary to change portions of a lure while fishing from a boat in rough waters. Under such circumstances, the lure must be easy to manipulate so that the changes can be carried out quickly, with minimal chance of snagging one's clothing or body with hooks projecting from the lure.

SUMMARY OF THE INVENTION

In response to the foregoing considerations, the fish lure according to the invention overcomes the drawbacks of prior art fish lures employing interchangeable components and provides an inexpensive fish lure having body portions which are easily interchangeable. A plurality of body portions differing in color and shape may be carried by the fisherman and substituted as necessary. Although the body portions can be interchanged rapidly, the resultant assembly is very strong and capable of undergoing various fishing operations such as casting, trolling, and the like without damage.

The invention includes a plurality of elongate, generally ellipsoidal-shaped body portions, each having an axially extending ventral slot. The ventral slot extends into the interior of the body portion a sufficient depth to form a chamber. A pair of laterally extending slots are formed in the body portion at approximately the midline of the body portion at each end of the body portion. The laterally extending slots intersect the ventral slot. The lower part of the body portion includes projections that effectively extend the length of the ventral slot.

A hook-carrying member, or hook carrier, in the form of an elongate bar is secured to the body portion. The bar includes a laterally extending tab at one end. Upon inserting the bar into the ventral slot, the laterally extending tab may be hooked onto one of the projections to assist in attaching the hook carrier to the body portion. A pair of spaced tabs having openings extend outwardly of the bar along one edge of the bar. When the hook carrier is properly secured to the body portion, the spaced tabs project outwardly of the body portion and enable hooks to be secured to the hook carrier. The hook carrier also includes an upwardly projecting hooked portion located toward the end of the bar remote from the laterally extending tab. The hook carrier further includes an upwardly projecting tab located at the end of the bar remote from the laterally extending tab. The upwardly projecting tab includes an opening for attachment of a fishing line.

A wedge is provided to engage the hooked portion and one of the laterally extending slots so as to secure the wedge to the hooked portion and, consequently, the hook carrier within the body portion. When properly assembled, the hooked portion is disposed within the chamber so as to prevent relative axial movement between the body portion and the hook carrier. The wedge is a planar structure having an axially extending slot extending along a major portion of the centerline of the wedge. A slot-like opening also is formed in the wedge in line with the axially extending slot. The slot-like opening receives the hooked portion of the hook carrier, while the axially extending slot receives the upwardly projecting tab of the hook carrier.

When it is desired to change body portions, the wedge is pulled out of the laterally extending slot a distance sufficient to disengage the hooked portion and the slot-like opening. The hook carrier then can be pivoted downwardly, thereby permitting the wedge to be removed from the body portion. Thereafter, the hook carrier can be moved axially of the body portion to disengage the laterally extending tab from the body portion. After another body portion has been selected, the hook carrier is inserted into the new body portion by reversing the foregoing steps, and is locked in place by the wedge. Throughout the body portion changing process, the fishing line can remain secured to the hook carrier. Because the body portion does not have hooks attached to it, a plurality of body portions can be carried by a fisherman in one pocket or placed in a compartment of a tackle box without tangling the body portions.

Each of the body portions is manufactured in a molding operation through the use of a plastics material. The hook carrier and the wedge each are manufactured in a single-step stamping operation. All of the components are exceedingly inexpensive and easy to manufacture.

The foregoing, as well as other features and advantages of the invention, are described in the accompanying specification and claims and are illustrated in the accompanying drawing.

BRIEF DESCRIPTION OF THE DRAWING

FIG. 1 is a perspective view of a fish lure according to the invention attached to a fishing line by means of a detachable clip;

FIG. 2 is a cross-sectional view of the fish lure of FIG. 1 taken along a plane indicated by line 2—2 in FIG. 1, with hooks and fish line removed for clarity of illustration;

FIG. 3 is a view similar to FIG. 2 in which a wedge and hook carrier have been moved to a different position relative to a body portion;

FIG. 4 is a view similar to FIG. 3 in which the wedge and hook carrier have been moved relative to the body portion;

FIG. 5 is a view similar to FIG. 4 in which the wedge has been removed and the hook carrier has been moved relative to the body portion;

FIG. 6 is a view taken along a plane indicated by line 6—6 in FIG. 2; and

FIG. 7 is a view taken along a plane indicated by line 7—7 in FIG. 2.

DESCRIPTION OF THE PREFERRED EMBODIMENT

Referring to FIG. 1, an artificial fish lure according to the invention is indicated generally by the reference numeral 10. In the description that follows, such terms as "underside," "laterally," "horizontally," "lower" and the like are used for convenience only, and their use is not to suggest that any particular spatial orientation of the invention is necessary or desirable. In FIG. 1, the lure 10 is attached to a fishing line 12 by means of a detachable clip 14. A pair of hooks 16 are suspended from the underside of the lure 10. The line 12, the clip 14, and the hooks 16 each are commercially available items as is well known in the art.

The lure 10 includes a body portion 20, a hook-carrying member, or hook carrier 40, and a wedge 60. The body portion 20 is formed of a plastics material such as polypropylene in a molding operation. If necessary, the body portion can be formed in two pieces and thereafter glued or ultrasonically welded to form a completed body portion 20. The hook carrier 40 and the wedge 60 are formed from metal such as aluminum. Both the hook carrier 40 and the wedge 60 can be formed in a single stamping operation. Because the components of the lure 10 are formed of relatively inexpensive materials and by techniques which are relatively inexpensive, the cost to the consumer of the lure 10 is quite favorable.

Referring also to FIGS. 2-7, the body portion 20 is a symmetrical, generally ellipsoidal-shaped member having an axially extending ventral slot 22 running the length of the body portion 20. A pair of laterally extending slots 24 having tapered side walls 25 are formed at opposite ends of the body portion 20 at approximately the mid-line of the body portion 20. The laterally extending slots 24 intersect the ventral slot 22. The slots 24 converge slightly toward the center of the body portion 20. A chamber 26 is formed within the body portion 20. The chamber 26 is a continuation of the ventral slot 22 into the center of the body portion 20. The chamber 26 includes end walls 28 positioned at right angles to the slots 24, and a top wall 30. The lower part of the body portion 20 includes projections 32 at each end that effectively extend the length of the ventral slot 22. Each of the projections 32 includes a flat upper surface 34 that effectively extends the length of the laterally extending slots 24. The upper part of the body portion 20 terminates at a rounded edge indicated by the numeral 36.

Although only one body portion 20 is shown in the FIGURES, it is to be understood that a plurality of differently colored and slightly differently configured body portions 20 will be provided for use by fishermen. It is expected that a fisherman will carry different ones of the body portions 20 for use under different fishing conditions. Because the body portions 20 do not include hooks, the body portions 20 can be carried in a single pocket or container without the possibility of the body portions 20 becoming tangled with each other. Different body portions 20 may be manufactured from materials having a greater or lesser buoyancy, different colors, different reflectivity characteristics, various decorative stripes, and other features commonly found in artificial lures.

The hook carrier 40 is engageable with the body portion 20 and provides a secure attachment for the body portion 20 as well as for the hooks 16 and the line 12. The hook carrier 40 includes an elongate bar 42 from which a laterally extending tab 44 projects at one end. A pair of spaced tabs 46 having openings extend outwardly of the bar 42 along the lower edge of the bar 42. When the hook carrier 40 and the body portion 20 are assembled, the tabs 46 extend outwardly of the ventral slot 22 a small distance sufficient to permit the hooks 16 to swing freely along the underside of the lure 10. The hook carrier 40 includes an upwardly projecting hooked portion 48 located toward the end of the bar 42 remote from the laterally extending tab 44. The hook carrier 40 also includes an upwardly projecting tab 50 having an opening for receiving the clip 14. The tab 50 is located at the end of the bar 42 remote from the laterally extending tab 44. The axial spacing between the hooked portion 48 and the tab 50 is slightly greater than the distance between the end wall 28 and the rounded edge 36.

The wedge 60 is a planar member having bifurcated sections 62 converging at one end to an apex 64. Side edges 65 are provided to tightly engage the side walls 25 of the body portion 20 when the wedge 60 is fitted in place within the slot 24. The sections 62 extend for approximately two-thirds the length of the wedge 60. An axially extending slot 66 is formed in the wedge 60 at its midline. The slot 66 extends a major portion of the length of the wedge 60, somewhat more than the axial extent of the sections 62. A slot-like opening 68 also is formed in the wedge 60 in line with the axially extending slot 66. The slot-like opening 68 is of a size and shape so as to receive the hooked portion 48 of the hook carrier 40. The spacing between the hooked portion 48 and the tab 50, and the spacing between the slot 66 and the slot-like opening 68 are such as to enable the tab 50 to be received in the slot 66 while, at the same time, the hooked portion 48 is received in the slot-like opening 68.

Referring particularly to FIGS. 2-5, when it is desired to change body portions 20, the wedge 60 is pulled out of the laterally extending slot 24 within which it had been wedged as far as possible. Simultaneously, the hook carrier 40 is pivoted downwardly to that position shown in FIG. 3 and the hook carrier 40 and the wedge 60 can be moved axially of the body portion 20 to that position shown in FIG. 4. Continued movement of the hook carrier 40 and the wedge 60 relative to the body portion 20 will enable the wedge 60 to be removed from the hook carrier 40. The hook carrier 40 then can be pushed to the right as viewed in FIG. 5 without the wedge 60 in place. Provided the hook carrier 40 (with the wedge 60 still removed) is pivoted to that position shown in FIG. 5, eventually the laterally extending tab 44 will clear the end of the projection 32. Thereafter, the hook carrier 40 can be moved out of the ventral slot 22 so as to free the body portion 20 for complete removal.

In order to attach another body portion 20, it is necessary only that the foregoing steps be reversed. Specifically, the hook carrier 40 is held at an angle to the horizontal and the bar 42 is inserted into the ventral slot 22 such that the laterally extending tab 44 clears the end of the projecting portion 32. Thereafter, the hook carrier 40 can be moved to the left as viewed in the FIGURES to an extreme leftward position. The wedge 60 then can be fitted about the hooked portion 48 and the tab 50 and the hook carrier 40 with wedge 60 attached then can be moved to the right as viewed in the FIGURES. Then the hook carrier 40 can be pivoted downwardly as viewed in FIG. 4 until the top of the hooked portion 48 clears the edge of the body portion 20 at the intersection between the ventral slot 22 and the laterally extending slot 24. Continued movement of the hook carrier 40 and the wedge 60 to the right to that position shown in FIG. 3 eventually will result in the hooked portion 48 being able to fit within the chamber 26. The hook carrier 40 then can be pivoted upwardly to that position shown in FIG. 2 until the hooked portion 48 engages the end wall 28. Thereafter, the wedge 60 can be pushed to the right as viewed in FIG. 2 to engage the walls 25 and the edges 65 to tightly lock the assembly together.

Although the description of the assembly of the invention is somewhat involved, the actual practice of the assembly of the invention is quite easy to accomplish. Body portions 20 can be changed quickly under adverse conditions, with little chance that the hooks 16 will inadvertantly snag one's clothing or body. It is not even necessary to disconnect the fishing line 12 in order to change body portions 20. Because each of the body portions 20 is symmetrical, it can be switched end-for-end and the other slot 24 used, if necessary or desirable. By this approach, the effective life of the body portion 20 is effectively doubled. Moreover, the assembly of components is very strong. The interaction between the hooked portion 48 and the end wall 28 effectively absorbs loads imparted to the lure 10, and loads imparted to the wedge 60 only tend to further tighten the assembly.

Although the invention has been described in its preferred form with a certain degree of particularity, it will be understood that the present disclosure of the preferred embodiment is only by way of example and that various changes in the details of construction and combination and arrangement of parts may be resorted to without departing from the true spirit and scope of the invention as hereinafter claimed. It is intended that the patent shall cover, by suitable expression in the appended claims, whatever features of patentable novelty exist in the invention disclosed.

What is claimed is:

1. A fish lure, comprising:
    (a) a body portion having a first, axially extending ventral slot and a second slot positioned at right angles to the ventral slot and intersecting the ventral slot at one end of the body portion, the body portion also including a chamber having an end wall located at that end of the chamber proximate the second slot;
    (b) a hook carrier engageable with the body portion, the hook carrier having first projecting portions extending outwardly of the body portion for attachment of hooks, and a second projection extending outwardly of the body portion for attachment of a fishing line, the hook carrier being insertable into the ventral slot for retention there, the hook carrier including a third projection extendable into the chamber and engageable with the end wall; and
    (c) a wedge for securing the hook carrier and the body portion together, the wedge engageable with the third projection and insertable into the second slot whereby, upon tightening the wedge, the hook carrier and the body portion are fixedly secured relative to each other.

2. The fish lure of claim 1, wherein:
    (a) the body portion includes a third slot positioned at right angles with respect to the ventral slot, the third slot being located at the end of the body portion opposite to that where the second slot is located; and,
    (b) the hook carrier includes a laterally extending tab at one end for engagement with a surface of the body portion formed by the third slot.

3. The fish lure of claim 1, wherein the body portion is symmetrical, the chamber is symmetrical, and the hook carrier and the wedge can be secured to the body portion at either end of the body portion.

4. The fish lure of claim 1, wherein the wedge includes an axially extending slot, and a slot-like opening in line with the axially extending slot, the spacing between the slot-like opening and the axially extending slot being such that the second and third projections of the hook carrier can be received, respectively, by the the axially extending slot and the slot-like opening.

5. The fish lure of claim 4, wherein:
    (a) the wedge is a planar structure, and the axially extending slot divides the wedge into bifurcated sections converging at one end to an apex, the slot-like opening being located toward the apex; and,
    (b) the second slot defines sidewalls within the body portion, the converging side edges of the wedge being tightly engageable with the sidewalls when the wedge is fitted in place within the second slot.

6. A fish lure, comprising:
    (a) a symmetrical body portion having a first, axially extending ventral slot, a second slot positioned at right angles to the ventral slot and intersecting the ventral slot at one end of the body portion, a third slot positioned at right angles to the ventral slot and intersecting the ventral slot at the end of the body portion remote from the second slot, the body portion also including a chamber having end walls located at each end of the chamber proximate the second and third slots, the second and third slots also defining sidewalls converging toward the center of the body portion;
    (b) a hook carrier engageable with the body portion, the hook carrier having first projecting portions extending outwardly of the body portion adjacent the ventral slot for attachment of hooks, a second projection extending outwardly of the body portion for attachment of a fishing line, the hook carrier being insertable into the ventral slot for retention there, the hook carrier including a third projection extendable into the chamber and engageable with one of the end walls, the hook carrier also including a laterally extending tab at that end of the hook carrier remote from the second and third projections, the laterally extending tab engageable with a surface of the body portion formed by the second and third slots; and, (c) a wedge for securing the carrier and the body portion together, the wedge engageable with the third projection and insertable into either the second or third slots, the wedge including an axially extending slot dividing the wedge into bifurcated sections, and a slot-like opening in line with the axially extending slot, the spacing between the slot-like opening and the axially extending slot being such that the second and third projections of the hook carrier can be received, respectively, by the axially extending slot and the slot-like opening, the wedge also including converging side edges tapering to an apex adjacent the slot-like opening, the side edges engageable with the sidewalls defined by the second and third slots whereby, upon inserting the wedge into the body portion, the hook carrier and the body portion will be fixedly secured relative to each other.

* * * * *